US012654899B2

(12) United States Patent
Sun et al.

(10) Patent No.: US 12,654,899 B2
(45) Date of Patent: Jun. 16, 2026

(54) DINNER TRAY, DINNER TRAY HOLDER AND CHILD CARRIER

(71) Applicant: Wonderland Switzerland AG, Steinhausen (CH)

(72) Inventors: Mingxing Sun, Dongguan (CN); Hongtao Yin, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 259 days.

(21) Appl. No.: 18/509,681

(22) Filed: Nov. 15, 2023

(65) Prior Publication Data

US 2024/0166402 A1 May 23, 2024

(30) Foreign Application Priority Data

Nov. 18, 2022 (CN) .......................... 202211450979.3
Mar. 17, 2023 (CN) .......................... 202310264980.5

(51) Int. Cl.
B65D 1/36 (2006.01)
B62B 9/00 (2006.01)
B65D 25/22 (2006.01)

(52) U.S. Cl.
CPC .................. B65D 1/36 (2013.01); B62B 9/00 (2013.01); B65D 25/22 (2013.01)

(58) Field of Classification Search
CPC . B65D 1/36; B65D 1/34; B65D 25/22; B65D 25/20; B62B 9/00
See application file for complete search history.

(56) References Cited

U.S. PATENT DOCUMENTS

| 4,856,809 | A | | 8/1989 | Kohus et al. | |
|---|---|---|---|---|---|
| 5,458,394 | A | | 10/1995 | Nichols et al. | |
| 5,732,847 | A | | 3/1998 | Caldi | |
| 5,855,384 | A | | 1/1999 | Pike et al. | |
| 5,964,501 | A | * | 10/1999 | Magnani | B62B 9/245 |
| | | | | | 297/188.2 |
| 6,298,793 | B1 | * | 10/2001 | Turner | A47D 15/00 |
| | | | | | 108/26 |

(Continued)

FOREIGN PATENT DOCUMENTS

| CN | 2200358 | Y | | 6/1995 |
|---|---|---|---|---|
| CN | 2226888 | Y | * | 5/1996 |

(Continued)

OTHER PUBLICATIONS

"First Office Action Issued in Corresponding Australian Patent Application No. 2023266372", Mailed Date: Feb. 22, 2025, 6 pages.

(Continued)

*Primary Examiner* — John D Walters
(74) *Attorney, Agent, or Firm* — Volpe Koenig

(57) ABSTRACT

The present disclosure provides a dinner tray, a dinner tray holder, and a child carrier. The dinner tray includes a dinner tray body and at least one inserting member extending from the dinner tray body, and the at least one inserting member is configured to be detachably engaged with at least one inserting slot of a dinner tray holder. The dinner tray holder includes at least one inserting slot configured to be detachably engaged with at least one inserting member of the dinner tray. The child carrier includes the dinner tray and the dinner tray holder.

20 Claims, 12 Drawing Sheets

(56) References Cited

U.S. PATENT DOCUMENTS

| | | | | |
|---|---|---|---|---|
| 7,621,431 B2 * | 11/2009 | Williams | ................ | B62B 9/245 |
| | | | | 224/282 |
| 7,942,437 B2 * | 5/2011 | Moore | .................... | B62B 9/245 |
| | | | | 280/650 |
| 12,097,896 B2 * | 9/2024 | Sun | ........................ | B62B 9/245 |
| 2002/0158445 A1 | 10/2002 | Hsia | | |
| 2010/0072792 A1 | 3/2010 | Moore | | |
| 2014/0070061 A1 | 3/2014 | Tsai | | |

FOREIGN PATENT DOCUMENTS

| | | | | |
|---|---|---|---|---|
| CN | 201822392 U | | 5/2011 | |
| CN | 102224054 A | | 10/2011 | |
| CN | 202320448 U | * | 7/2012 | |
| CN | 202541616 U | | 11/2012 | |
| CN | 204110119 U | | 1/2015 | |
| CN | 205890965 U | | 1/2017 | |
| CN | 208403878 U | | 1/2019 | |
| CN | 209106731 U | | 7/2019 | |
| EP | 1427308 B1 | | 4/2007 | |
| KR | 20120003699 U | | 5/2012 | |
| KR | 102358499 B1 | | 2/2022 | |
| TW | 202132147 A | | 9/2021 | |
| WO | 2004014198 A2 | | 2/2004 | |

OTHER PUBLICATIONS

"First Office Action Issued in Corresponding Japanese Patent Application No. 2023-194796" along with Partial English Translation, Mailed Date: Feb. 25, 2025, 7 pages.

"Extended European Search Report Issued in Corresponding European Patent Application No. 23210293.9", Mailed Date: Mar. 26, 2024, 7 pages.

First Office Action Issued in Corresponding Taiwanese Patent Application No. 112144241, Mailed Date: Aug. 30, 2024, 13 pages (Partial Translation Enclosed).

Japan Patent Office. Office Action for corresponding application JP 2023-194796, along with English translation, dated Jan. 24, 2025.

Taiwan Intellectual Property Office. Office Action for corresponding application TW 114127591, along with partial English translation, dated Sep. 10, 2025.

* cited by examiner

DINNER TRAY, DINNER TRAY HOLDER AND CHILD CARRIER

CROSS-REFERENCE TO RELATED APPLICATIONS

The present disclosure claims priority of Chinese Patent Application No. 202211450979.3, filed on Nov. 18, 2022 and Chinese Patent Application No. 202310264980.5, filed on Mar. 17, 2023, the content of which is hereby incorporated by reference in its entirety.

TECHNICAL FIELD

The present disclosure relates to a dinner tray, a dinner tray holder and a child carrier.

BACKGROUND

In order to improve the practicality of child strollers, some child strollers have a dinner tray detachably mounted on front armrests, so that children riding in the child strollers can use the dinner tray to have a meal conveniently. A front side of the dinner tray in the conventional art is provided with a holding arm, and a lower end of the holding arm has a mounting notch. When it is necessary to assemble the dinner tray on the front armrest, the mounting notch of the holding arm is aligned with the front armrest, and then the dinner tray is pressed downward until the front armrest enters into the interior of the holding arm through the mounting notch and is gripped by the holding arm, so that the dinner tray is connected to the front armrest. When it is necessary to disassemble the dinner tray, it is necessary to forcefully lift the dinner tray upward in order to release the holding arm on the front armrest. The assembly and disassembly of the dinner tray and the front armrest is inconvenient. In addition, the holding arm of the dinner tray is located on the outside of the front armrest, which affects the overall appearance of the armrest.

SUMMARY

Accordingly, it is necessary to provide a dinner tray, a dinner tray holder, and a child carrier.

A dinner tray includes a dinner tray body and at least one inserting member extending from the dinner tray body. The at least one inserting member is configured to be detachably engaged with at least one inserting slot of a dinner tray holder.

A dinner tray holder is provided with at least one inserting slot configured to be detachably engaged with at least one inserting member of a dinner tray.

A child carrier includes the aforementioned dinner tray and the aforementioned dinner tray holder. The dinner tray holder is a front armrest of the child carrier, and the dinner tray is supported by the dinner tray holder through an engagement of at least one inserting member with at least one inserting slot of the dinner tray holder.

A child carrier is provided. A frame of the child carrier includes the aforementioned dinner tray holder.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

Figure 1:
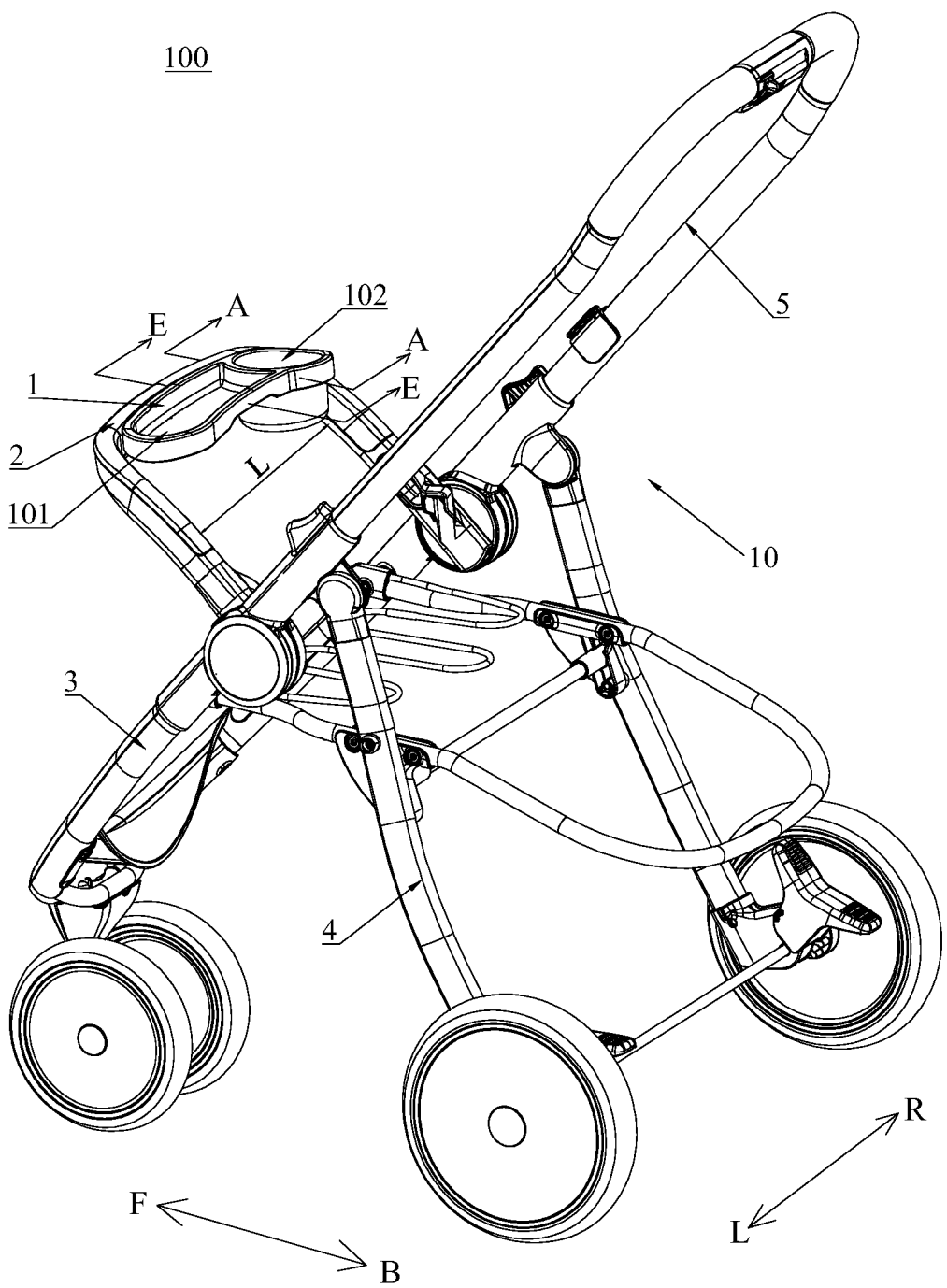
FIG. 1 is a perspective view of a child carrier according to an embodiment.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

FIG. 1 is a perspective view of a child carrier 100 according to an embodiment of the present disclosure. The child carrier 100 includes a dinner tray 1 and a dinner tray holder 2. Hereinafter, the dinner tray 1 and the dinner tray holder 2 will be described together with the description of the child carrier 100.

In an embodiment shown in FIG. 1, the child carrier 100 will be described by taking a child stroller as an example. A main structure 10 (i.e., a frame) of the child carrier 100 includes a dinner tray holder 2, a front foot support 3, a rear foot support 4, and a pushing handle 5, etc. A seat (not shown) for a child can be mounted on the main structure 10. The dinner tray holder 2 may also be configured as a front armrest, which is located above the seat to provide safety protection for the child. The dinner tray 1 is detachably mounted on the dinner tray holder 2. When the dinner tray 1 is mounted on the dinner tray holder 2, the child sitting on the seat can have the meal conveniently using the dinner tray 1. When the dinner tray 1 is detached from the dinner tray holder 2, the child sitting on the seat can have more space to move around. It should be understood that, although the child carrier 100 is described as the child stroller in the present embodiment, in alternative embodiments, the child carrier 100 is not limited to the child stroller, and it may be, for example, a child dining chair, a child highchair, a playpen, a crib, a child tricycle, etc.

It should be noted that, unless otherwise clearly stated and limited, the terms "front", "rear", "left" and "right" in the embodiments of the present disclosure are based on the "front", "rear", "left" and "right" of a child riding in a child carrier, and arrows F and B are used to schematically show the "front" and "back" directions in the figure, and arrows L and R are used to schematically show the "left" and "right" direction. These directional terms are only used to make the description of the embodiments of the present disclosure clearer and are not used to limit the protection scope of the present disclosure.

Figure 2:
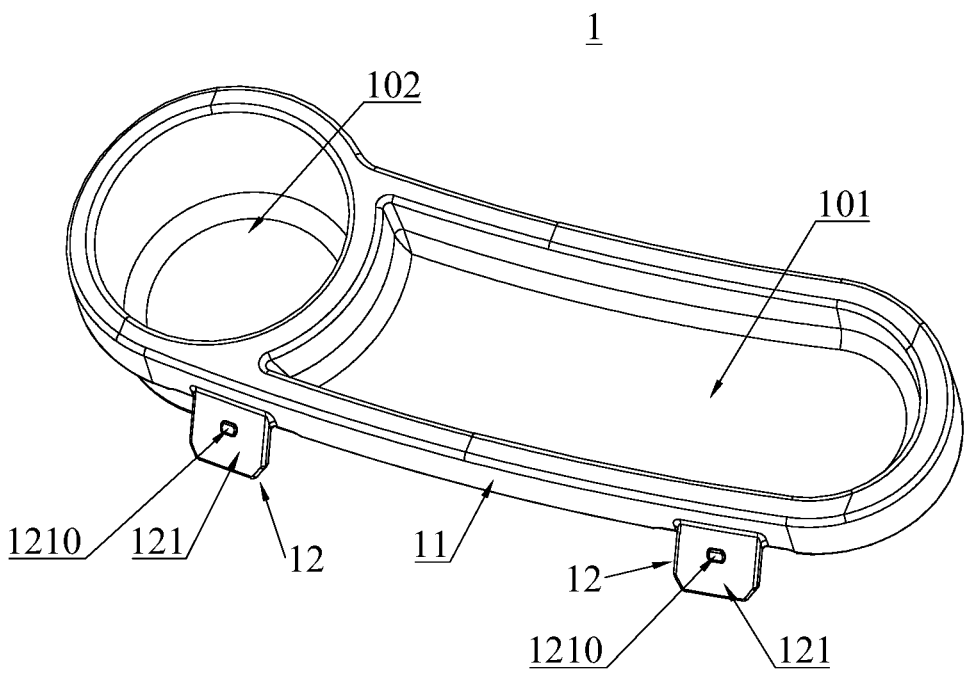
FIG. 2 is a perspective view of a dinner tray according to a first embodiment viewed from one aspect.
Figure 3:
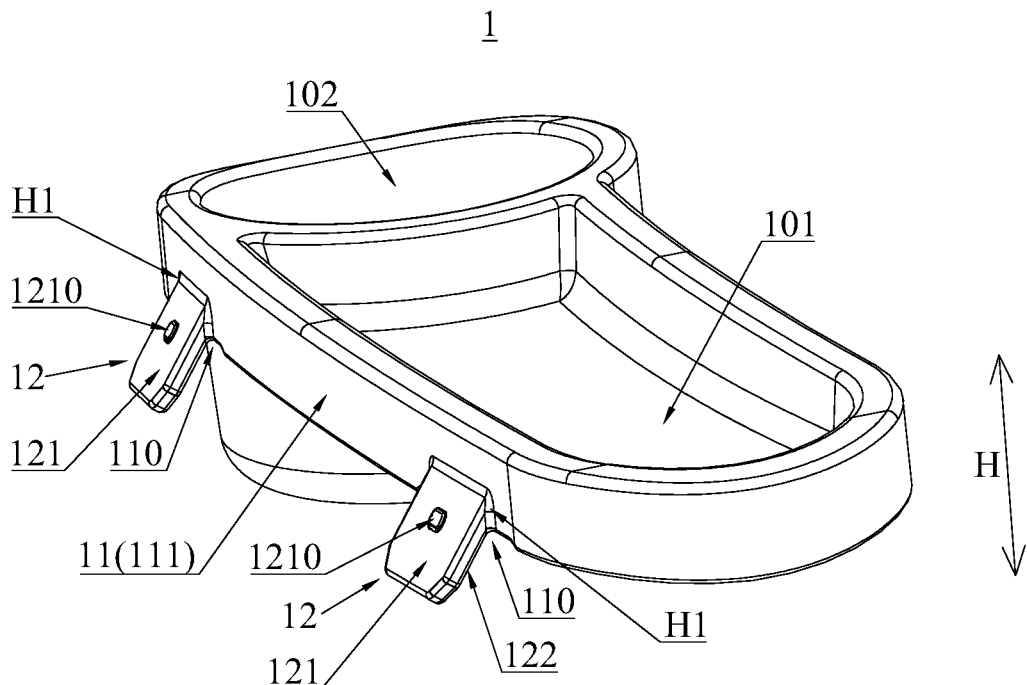
FIG. 3 is a perspective view of the dinner tray shown in FIG. 2 viewed from another aspect.

FIGS. 2 and 3 are perspective views of the dinner tray 1 according to the first embodiment of the present disclosure. The dinner tray 1 includes a dinner tray body 11 and two inserting members 12 extending from the dinner tray body 11. An upper surface of the dinner tray body 11 is divided into two areas, namely a first area 101 and a second area 102. The first area 101 and the second area 102 may have different depths and sizes, so as to facilitate classification of different items. In alternative embodiments, the upper surface of the dinner tray body 11 may not be divided into more areas. The two inserting members 12 are located on the same side of the dinner tray body 11, specifically, on a front side of the dinner tray body 11. The two inserting members 12 are spaced apart along a length direction L (i.e., the left and right directions of the child carrier 100, see FIG. 1) of the dinner tray body 11.

Figure 4:
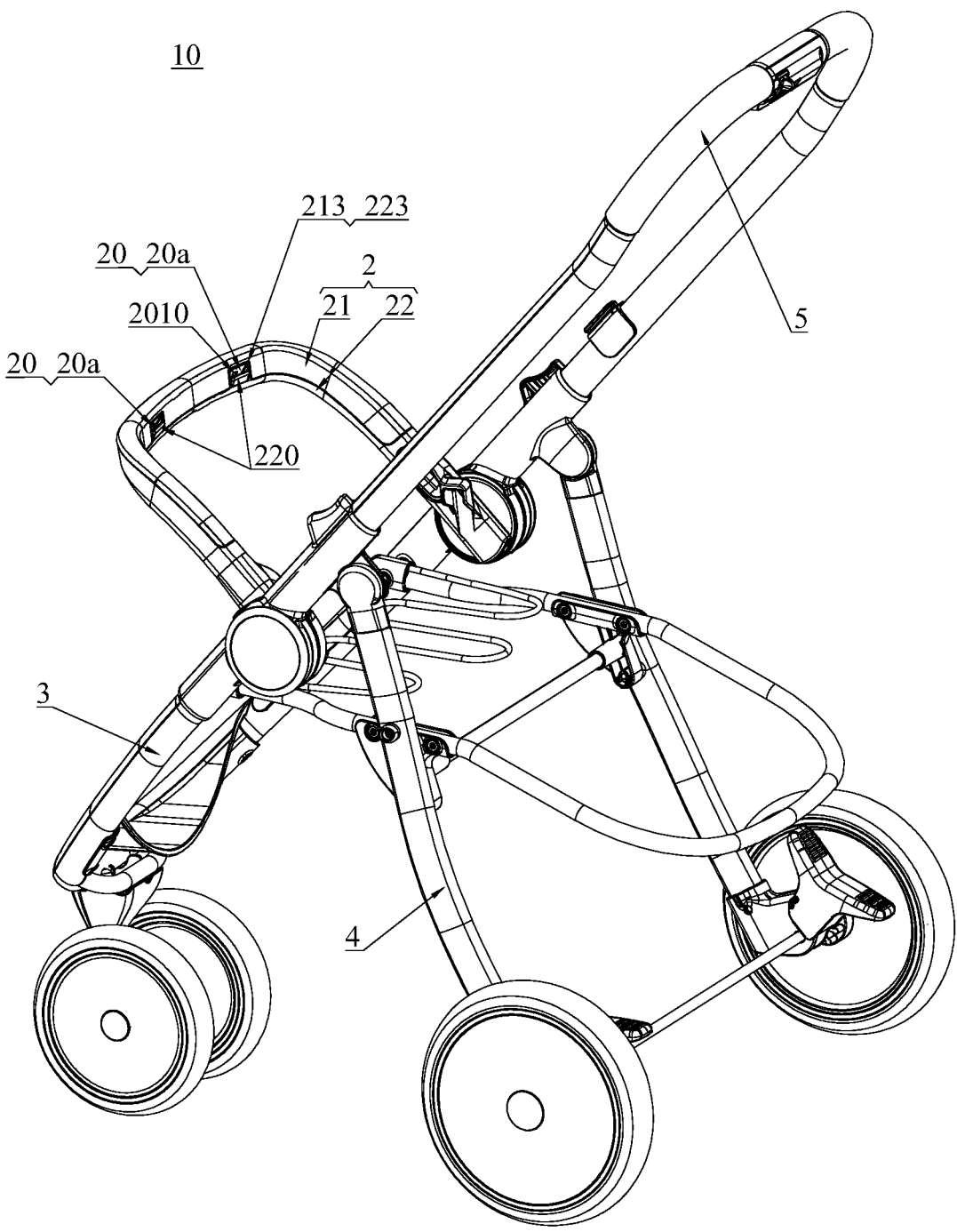
FIG. 4 is a perspective view of a child carrier according to an embodiment.

Referring to FIG. 4, in some embodiments, the dinner tray holder 2 is provided with two inserting slots 20, which are in one-to-one correspondence with the two inserting members 12 of the dinner tray 1. In some embodiments, the two inserting slots 20 are located on a rear side of the dinner tray holder 2.

Figure 5:
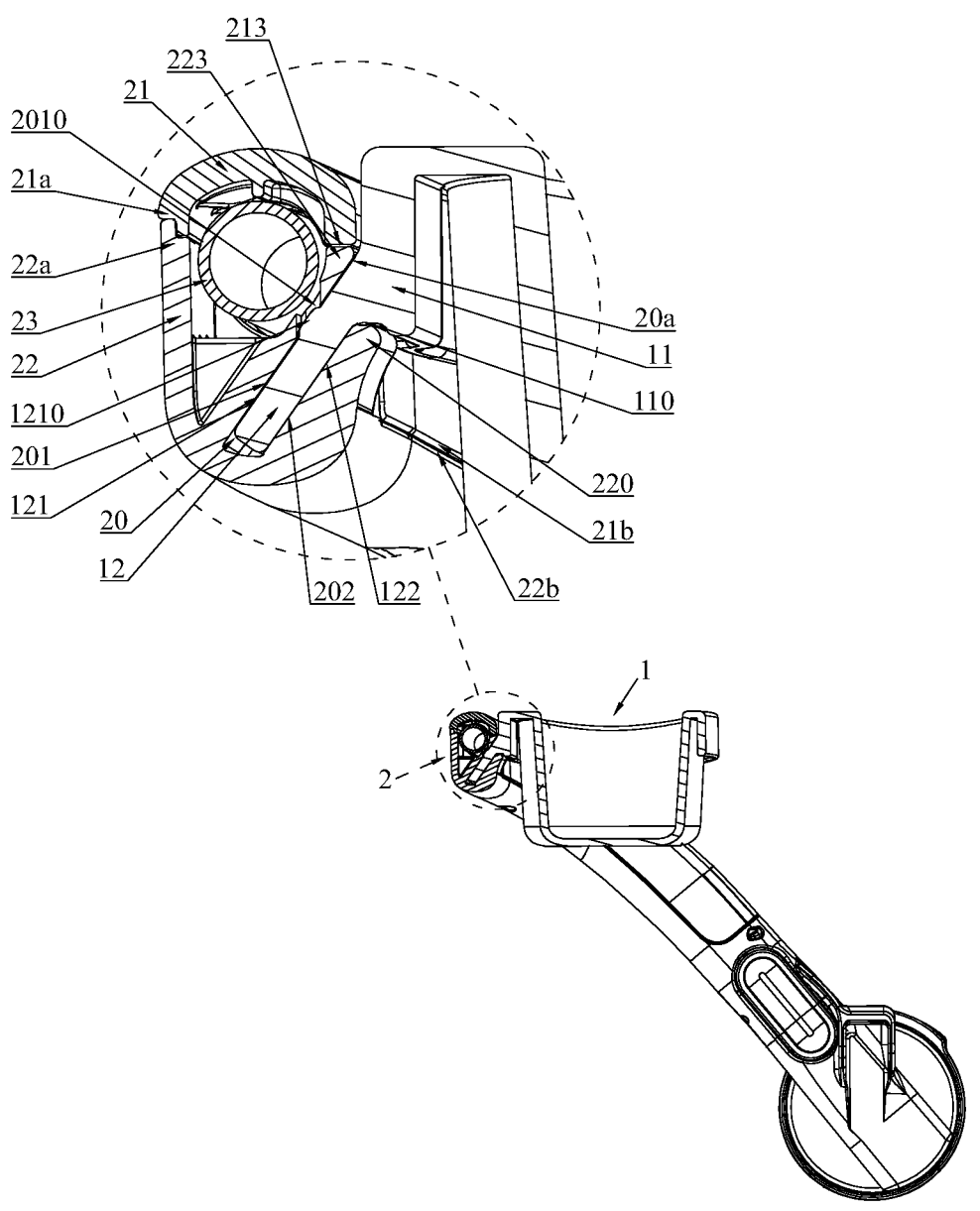
FIG. 5 is a cross-sectional view taken along the line A-A of FIG. 1, in which the dinner tray is engaged with the dinner tray holder.
Figure 6:
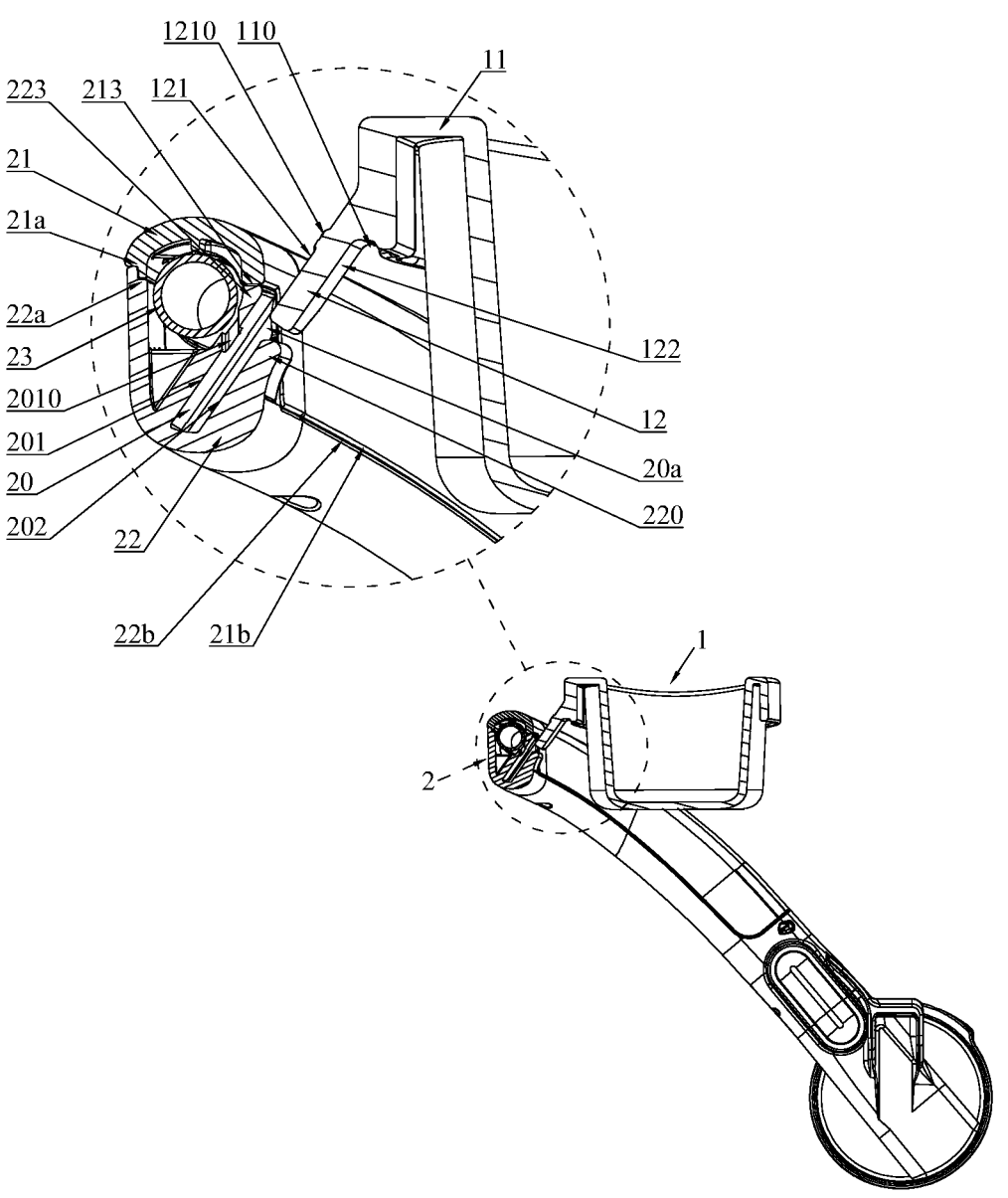
FIG. 6 is a cross-sectional view taken along the line A-A of FIG. 1, in which the dinner tray is disengaged from the dinner tray holder.

Referring to FIGS. 5 and 6, the two inserting members 12 of the dinner tray 1 are configured to be detachably engaged with the two inserting slots 20 of the dinner tray holder 2, thus facilitating the quick positioning and mounting of the dinner tray 1 on the dinner tray holder 2, and the dinner tray 1 is supported by the dinner tray holder 2. In this case, the dinner tray 1 is located behind the dinner tray holder 2 and extends into the child's activity space. In some alternative embodiments, the two inserting members 12 can be disposed on a rear side of the dinner tray body 11, while the two inserting slots 20 are correspondingly located on a front side of the dinner tray holder 2. When each inserting member 12 is detachably engaged with the corresponding inserting slot 20, the dinner tray 1 is mounted on the dinner tray holder 2 and is located in front of the dinner tray holder 2. In this case, the dinner tray 1 does not occupy the child's activity space.

In the aforementioned embodiment, the dinner tray 1 can be easily mounted on or detached from the dinner tray holder 2 by inserting and pulling out the inserting member 12. Compared with the prior art in which the dinner tray 1 is detachably connected to the tray holder 2 through a holding arm, the mounting and detaching of the dinner tray 1 and the dinner tray holder 2 provided by the embodiment are more convenient and labor-saving. In addition, when the dinner tray 1 is mounted on the dinner tray holder 2, since the connector 12 is inserted into the inserting slot 20 instead of being held outside the dinner tray holder 2, the overall appearance of the dinner tray holder 2 is also less affected. Furthermore, the dinner tray 1 can be supported by the dinner tray holder 2 only through the engagement of the inserting member 12 and the inserting slot 20, which is also beneficial to reduce the impact on the appearance of the dinner tray holder 2.

In some alternative embodiments, at least one movable cover (not shown) may be mounted on the dinner tray holder 2. For example, the movable cover is movably connected to the dinner tray holder 2, so as to cover the inserting slot 20 when the dinner tray 1 is not mounted, thus preventing foreign objects from easily entering the inserting slot 20. For example, the movable cover is detachably or rotatably connected to the dinner tray holder 2. In case where the movable cover is detachably connected to the dinner tray holder 2, when the dinner tray 1 needs to be mounted on the dinner tray holder 2, the movable cover is removed from the dinner tray holder 2 to expose the inserting slot 20. After the dinner tray 1 is detached from the dinner tray holder 2, the movable cover can be remounted on the dinner tray holder 2 and cover the inserting slot 20. For example, the movable cover is detachably engaged with the dinner tray holder 2, so that the movable cover can be easily removed from the dinner tray holder 2. When the movable cover is rotatably connected to the dinner tray holder 2, the inserting slot 20 can be exposed or covered by rotating the movable cover relative to the dinner tray holder 2.

It should be noted that although in the above embodiment, the number of inserting members 12 and inserting slots 20 are both two. It should be understood that in alternative embodiments, the number of inserting members 12 is not limited to two, which may, for example, be one, three, four or more, and one inserting members 12 may be arranged in the middle of the front side of the dinner tray. The plurality of inserting members 12 are located on the same side of the dinner tray body 11 and are spaced apart along a length direction L (see FIG. 1) of the dinner tray body 11. Correspondingly, the number of inserting slots 20 is not limited to two. According to changes in the number and position of the inserting members 12, the number and position of the inserting slots 20 can also changed correspondingly.

Referring to FIG. 3, in some embodiments, the inserting member 12 extends obliquely downward relative to the dinner tray body 11. The two inserting members 12 extend from a first position H1 of the front side 111 of the dinner tray body 11. The first position H1 is lower than the upper surface of the dinner tray body 11 in the height direction H. In this way, when each inserting member 12 is connected to the corresponding inserting slot 20, the inserting member 12 itself is not exposed. It should be understood that when each inserting member 12 is provided on the rear side of the dinner tray body 11, each inserting member 12 can extend from the first position H1 of the rear side of the dinner tray body 11. In some embodiments, the inserting member 12 is in a shape of a sheet. The inserting member 12 can be integrally formed with the dinner tray body 11, or the inserting member 12 and the dinner tray body 11 may be attached, for example, by welding, screwing or riveting.

Referring to FIGS. 5 and 6, in some embodiments, the inserting slot 20 extends downward obliquely, and the shape of the inserting slot 20 matches the shape of the corresponding inserting member 12. When the inserting member 12 is inserted into the inserting slot 20, the inserting slot 20 arranged obliquely can guide the inserting member 12. When the inserting member 12 is inserted in place, an upper surface 121 of the inserting member 12 abuts against an upper side wall 201 of the inserting slot 20, and a lower surface 122 of the inserting member 12 abuts against a lower side wall 202 of the inserting slot 20. Under the action of gravity, the inserting member 12 is reliably secured in the inserting slot 20, and the dinner tray 1 is reliably supported by the dinner tray holder 2.

Continuing to refer to FIGS. 5 and 6, in some embodiments, a positioning recess 110 is formed between the inserting member 12 and the dinner tray body 11. Specifically, the positioning recess 110 is formed between the lower surface 122 of the inserting member 12 and the dinner tray body 11. A positioning protrusion 220 is provided at a lower portion of an opening 20a of the insertion inserting slot 20. For example, the positioning protrusion 220 protrudes outward relative to the opening 20a. When the inserting member 12 moves downward along the inserting slot 20, it can be easily determined that whether the inserting member 12 is inserted in place by the engagement of the positioning recess 110 with the positioning projection 220. In addition, the positioning protrusion 220 that protrudes outward relative to the opening 20a can have an appropriate cross-sectional shape to increase a contact area (stress-bearing area) with the positioning recess 110, so as to prevent a lower portion of the opening 20a from being easily damaged due to over-concentration of stress. In some embodiments, a top surface of the positioning protrusion 220 configured to be in contact with the positioning recess 110 is an arc-shaped surface. When the dinner tray 1 is removed, the arc-shaped positioning protrusion 220 will not easily scratch or hurt the child. In alternative embodiments, the opening 20a of the inserting slot 20 may be a normal opening (a periphery of the opening 20a is coplanar) instead of the positioning protrusion 220.

The shape of the inserting slot 20 is not limited to the above embodiments. In alternative embodiments, the shape of the inserting slot 20 may not match the shape of the corresponding inserting member 12. When the inserting member 12 is inserted in place, as long as the lower portion of the opening 20a of the inserting slot 20 can support the inserting member 12 and the upper side wall 201 of the inserting slot 20 abuts the upper surface 121 of the inserting member 12, the dinner tray 1 can also be supported on the dinner tray holder 2.

Continuing to refer to FIGS. 5 and 6, in some embodiments, the inserting member 12 may be provided with a first locking portion 1210, and the side walls (including the upper side wall 201 and the lower side wall 202) of the inserting slot 20 may be provided with a second locking portion 2010. When the inserting member 12 is inserted in place, the first locking portion 1210 is engaged with the second locking portion 2010 to lock the dinner tray 1, thus preventing the inserting member 12 from being easily pulled out from the inserting slot 20. In some embodiments, the first locking portion 1210 includes a protrusion formed on the upper surface 121 of the inserting member 12, and the second locking portion 2010 includes a notch formed on the upper side wall 201 of the inserting slot 20. When the inserting member 12 is inserted in place, the protrusion is latched to the notch, so as to lock the dinner tray 1. In order to facilitate the engagement and disengagement of the protrusion and the notch, the cross-section of the protrusion may be, for example, arc-shaped, trapezoidal or quasi-trapezoidal.

It should be understood that the configurations of the first locking portion 1210 and the second locking portion 2010 are not limited to the above embodiments. In alternative embodiments, the first locking portion 1210 includes a notch formed in the upper surface 121 of the inserting member 12, and the notch may extend through the upper surface 121 and the lower surface 122 of the inserting member 12. Correspondingly, the second locking portion 2010 includes a protrusion formed on the upper side wall 201 of the inserting slot 20. Furthermore, in alternative embodiments, the first locking portion 1210 may be formed on the lower surface 122 of the inserting member 12, and the second locking portion 2010 may be formed on the lower side wall 202 of the inserting slot 20.

Figure 7:
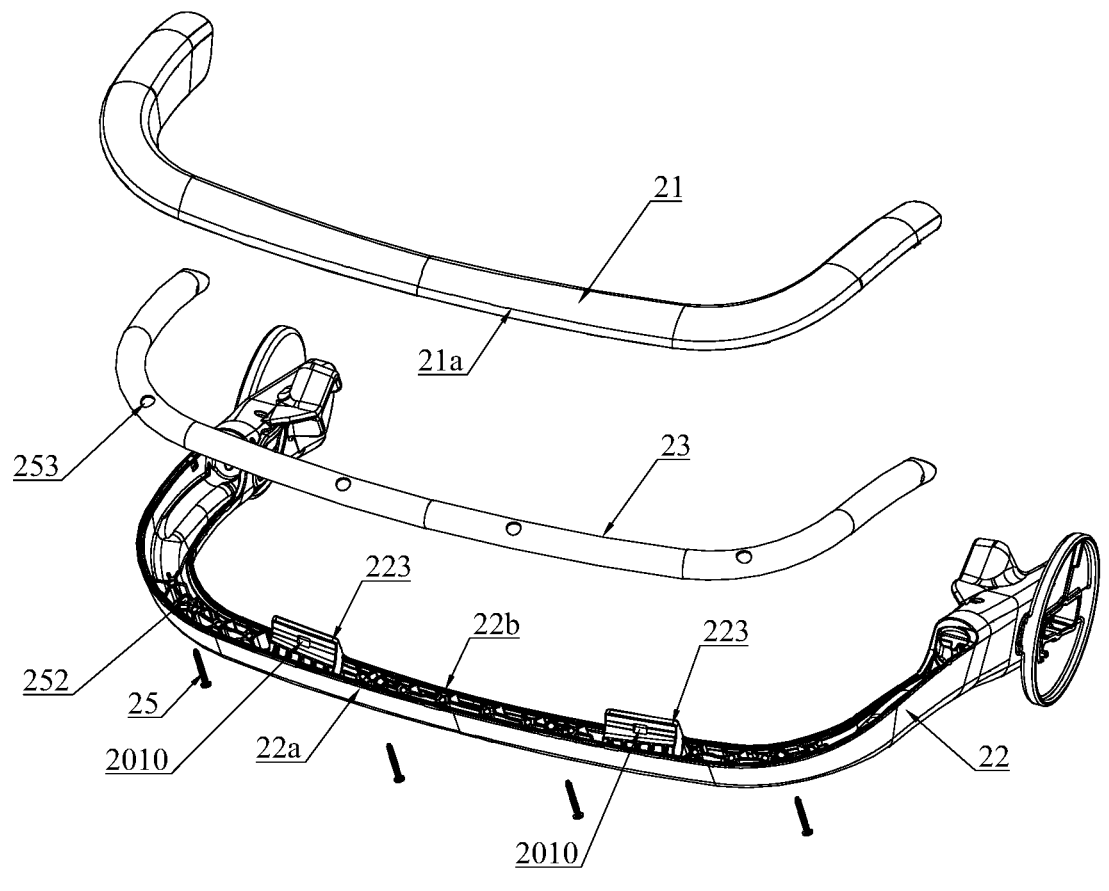
FIG. 7 is an exploded view of the dinner tray holder shown in FIG. 4 from one aspect.
Figure 8:
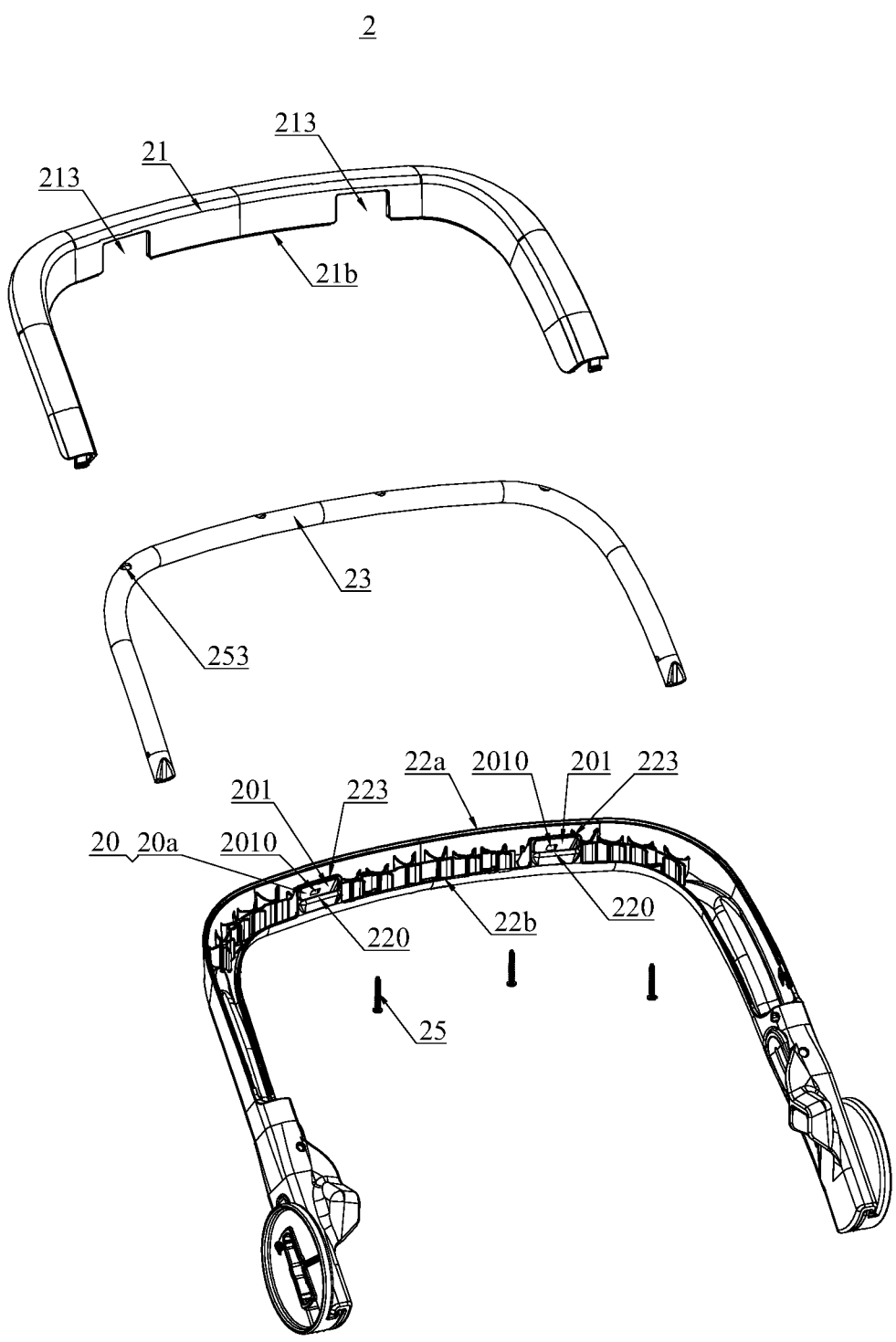
FIG. 8 is an exploded view of the dinner tray holder shown in FIG. 4 from another aspect.
Figure 9:
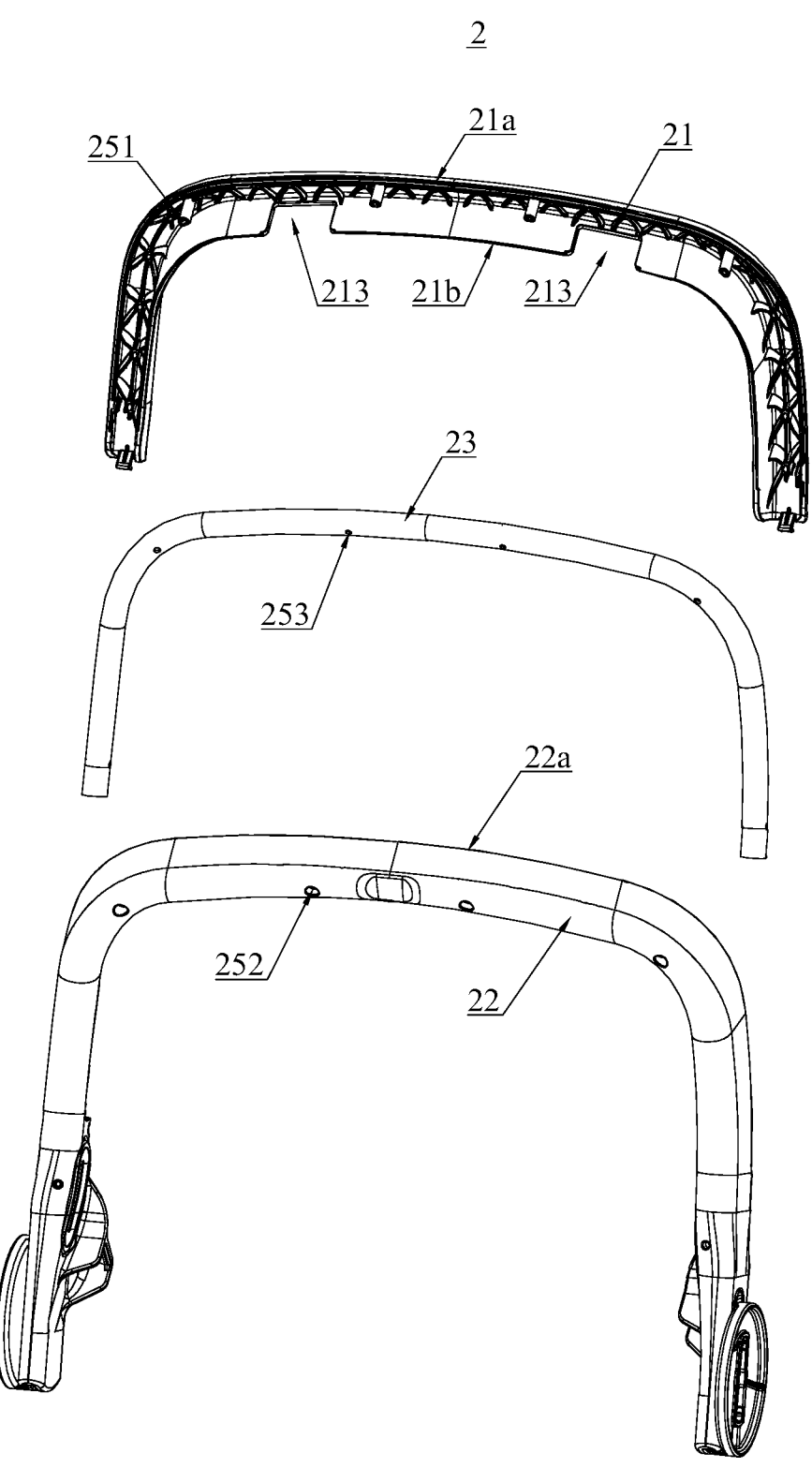
FIG. 9 is an exploded view of the dinner tray holder shown in FIG. 4 from yet another aspect.

FIGS. 7 to 9 are exploded views of the dinner tray holder 2, i.e., the front armrest. The dinner tray holder 2 includes an upper holder 21, a lower holder 22, and a tube body 23 that are mounted together. Specifically, the upper holder 21 is provided with a screw hole 251, the tube body 23 is provided with a through hole 253, and the lower holder 22 is provided with a through hole 252. A fastener 25 extends through the through hole 252 and the through hole 253 successively and then is screwed to the screw hole 251, so that the upper holder 21 and the lower holder 22 are connected together, and the tube body 23 is clamped between the upper holder 21 and the lower holder 22.

Referring to FIGS. 7 and 8, the upper holder 21 includes a first front edge 21a and a first rear edge 21b opposite to each other. The lower holder 22 includes a second front edge 22a and a second rear edge 22b opposite to each other. Referring to FIGS. 5 and 6, the first front edge 21a and the second front edge 22a are connected in a concave-convex fitting manner. The first rear edge 21b and the second rear edge 22b are connected.

Referring to FIG. 8, the upper holder 21 is provided with two receiving portions 213. For example, the two receiving portions 213 are provided on the first rear edge 21b of the upper holder 21. The lower holder 22 is provided with two protruding portion 223, which are arranged on the second rear edge 22 b of the lower holder 22. The two inserting slots 20 are located in the two protrusions 223. Referring to FIG. 4, the two receiving portions 213 and the two protruding portions 223 are engaged. By providing the protruding portions 223 and arranging the inserting slots 20 extending obliquely in the protruding portions 223, the internal space of the dinner tray holder 2 is fully utilized and the thickness of the dinner tray holder 2 can be reduced. In alternative embodiments, the positions of the receiving portion 213 and the protruding portion 223 on the upper holder 21 and the lower holder 22 may be interchanged. In addition, it should be understood that the number of the receiving portion 213 and the protruding portion 223 is not limited to two, but can be changed accordingly according to the change in the number of the inserting slots 20.

It should be noted that the configuration of the dinner tray holder 2 is not limited to the above embodiments. In alternative embodiments, the dinner tray holder 2 may be of one-piece structure. Alternatively, in other embodiments, the dinner tray holder 2 may include the upper holder 21 and the lower holder 22 without the tube body 23. The upper holder 21 and the lower holder 21 may be mounted together by any suitable means and are not limited to the above-mentioned screw connection.

Figure 10:
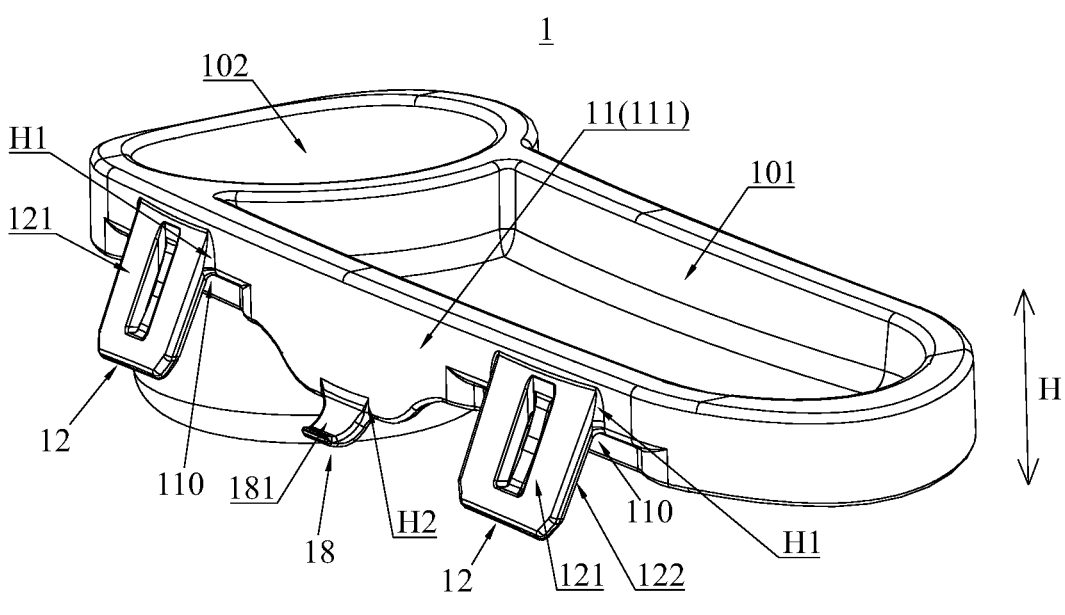
FIG. 10 is a perspective view of a dinner tray according to a second embodiment.
Figure 11:
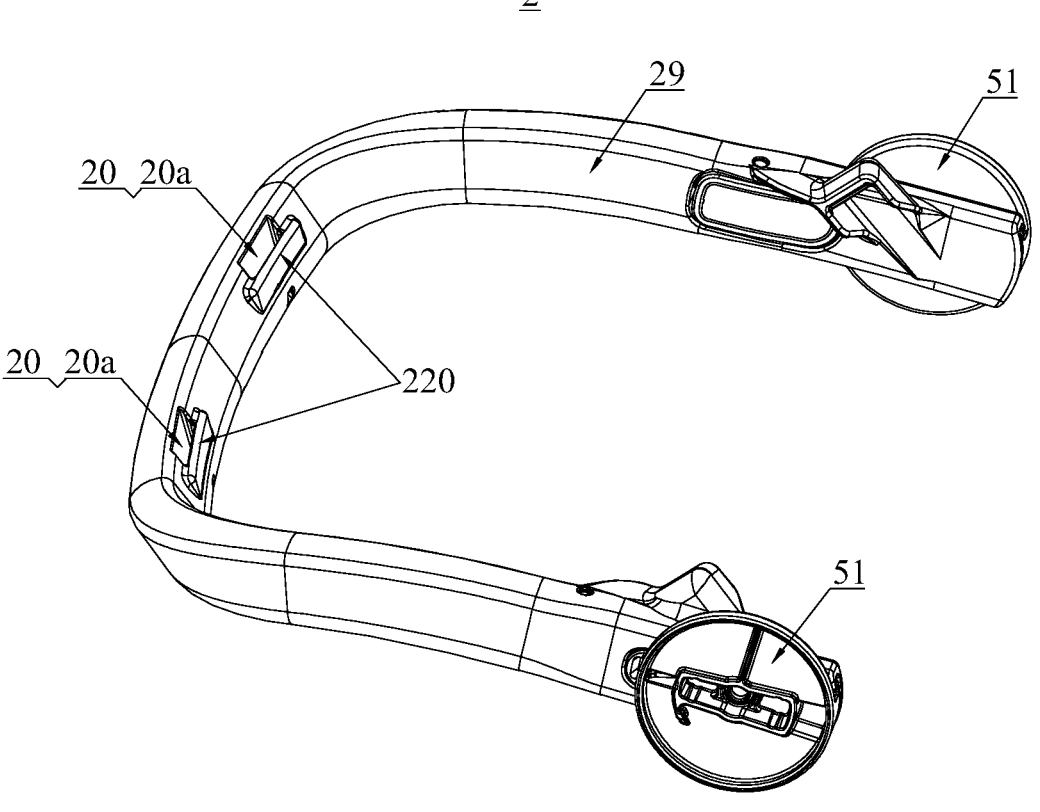
FIG. 11 is a perspective view of a dinner tray holder according to a second embodiment.

FIG. 10 is a perspective view of a dinner tray 1 according to a second embodiment of the present disclosure. The dinner tray 1 of the second embodiment is a modification of the dinner tray 1 of the first embodiment. The dinner tray 1 also includes a dinner tray body 11 and two inserting members 12 extending from the dinner tray body 11. FIG. 11 is a perspective view of a dinner tray holder 2 according to a second embodiment of the present disclosure. The dinner tray holder 2 of the second embodiment is a modification of the dinner tray holder 2 of the first embodiment. The dinner tray holder 2 also includes two inserting slots 20. Without contradiction, the structure of the dinner tray 1 and the dinner tray holder 2 are similar to that of the first embodiment. The differences between the dinner tray 1 and the dinner tray holder 2 of the second embodiment and the dinner tray 1 and the dinner tray holder 2 of the first embodiment will be described in greater detail.

Referring to FIG. 10, the dinner tray 1 further includes an engaging member 18 extending from the dinner tray body 11. The engaging member 18 and the inserting member 12 are located on the same side of the dinner tray body 11. Specifically, the two inserting members 12 and the engaging member 18 are located on a front side of the dinner tray body 11, and the engaging member 18 is located between the two inserting members 12 and is located obliquely below each inserting member 12. The engaging member 18 is configured to be detachably is latched to the dinner tray holder 2, so as to reliably mounted the dinner tray 1 to the dinner tray holder 2 together with the inserting member 12.

Figure 13:
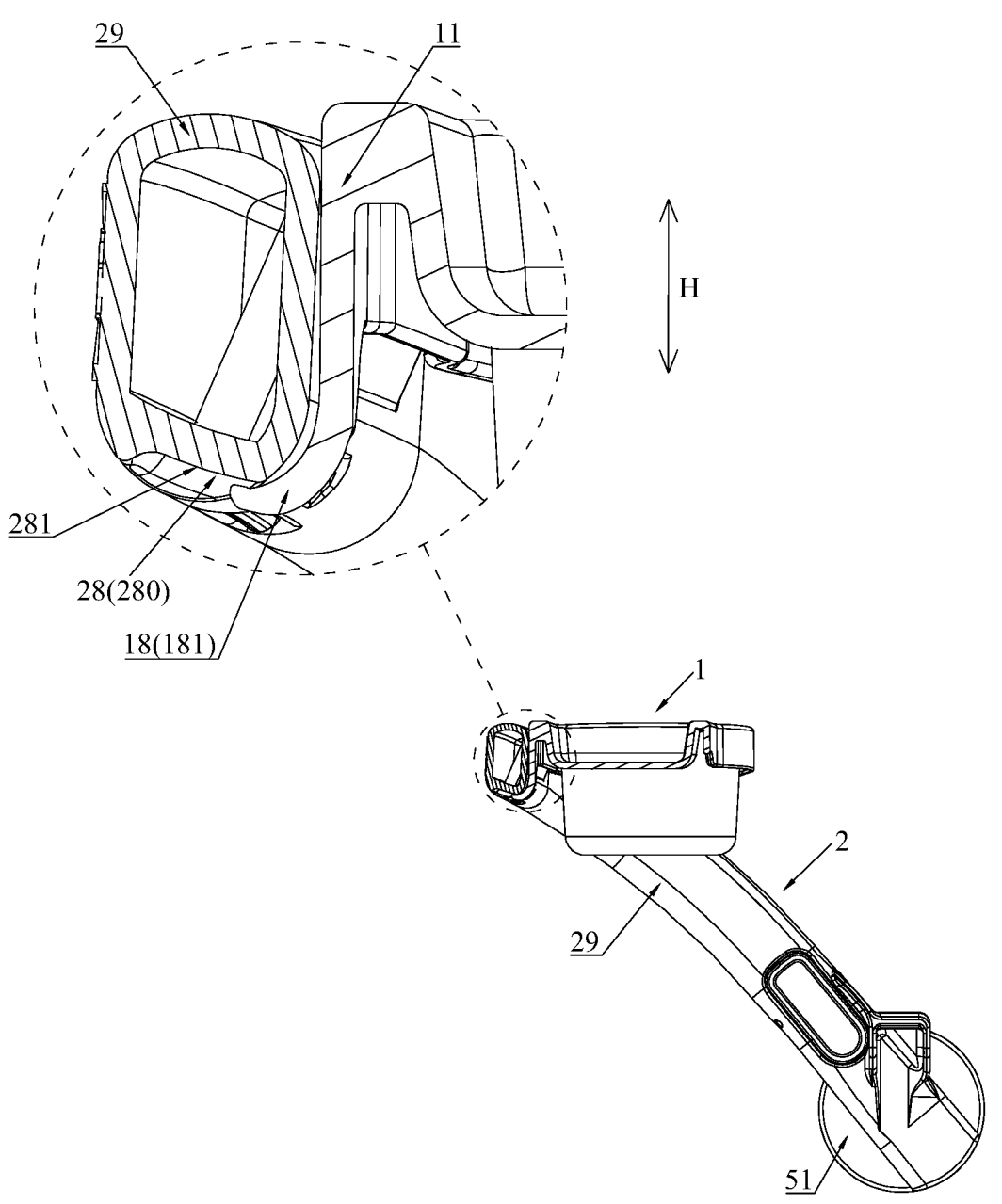
FIG. 13 is a cross-sectional view taken along the line E-E of FIG. 1, in which the dinner tray is engaged with the dinner tray holder.
Figure 14:
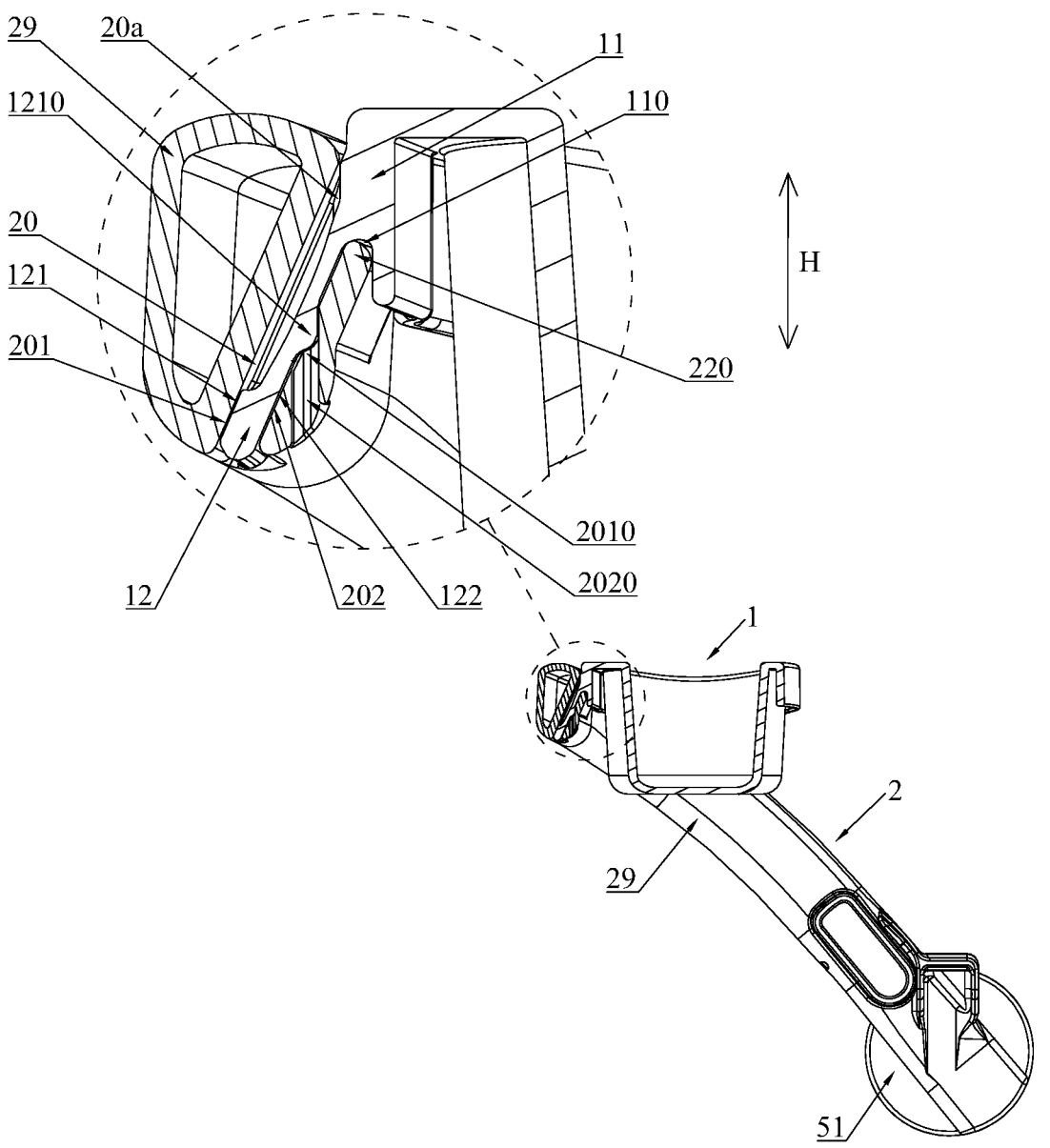
FIG. 14 is a cross-sectional view taken along the line A-A of FIG. 1, in which the dinner tray is engaged with the dinner tray holder.

Continuing to refer to FIG. 10, each inserting member 12 extends from a first position H1 of the front side wall 111 of the dinner tray body 11, and the engaging member 18 extends from a second position H2 of the front side wall of the dinner tray body 11 to protrude forward relative to the dinner tray body 11. The first position H1 is higher than the second position H2. That is, the inserting member 12 and the engaging member 18 are located at different heights. Referring to FIGS. 13 and 14, when the dinner tray 1 is mounted on the dinner tray holder 2, the inserting member 12 of the dinner tray 1 is inserted into the corresponding inserting slot 20 of the dinner tray holder 2, and the engaging member 18 is detachably latched to the dinner tray holder 2. Therefore, the inserting member 12 and the engaging member 18 form three positioning positions for the dinner tray 1, and the three positioning positions are the three vertices of a virtual triangle. In this way, the connection stability between the dinner tray 1 and the dinner tray holder 2 is improved, and the pressing strength of the dinner tray 1 is also improved, which effectively prevents the dinner tray 1 from shaking due to the heavy load.

Referring again to FIGS. 10 and 13, in some embodiments, the engaging member 18 is a hook 181, which extends forward from the front side wall 111 of the dinner tray body 11. The hook 181 may be integrally formed with the dinner tray body 11, and is configured to be latched to a bottom portion of the dinner tray holder 2. In alternative embodiments, the dinner tray 1 is mounted to the front of the dinner tray holder 2, the engaging member 18 extends rearward from the rear side wall of the dinner tray body 11 to be latched to the dinner tray holder 2 behind the dinner tray 1.

Figure 12:
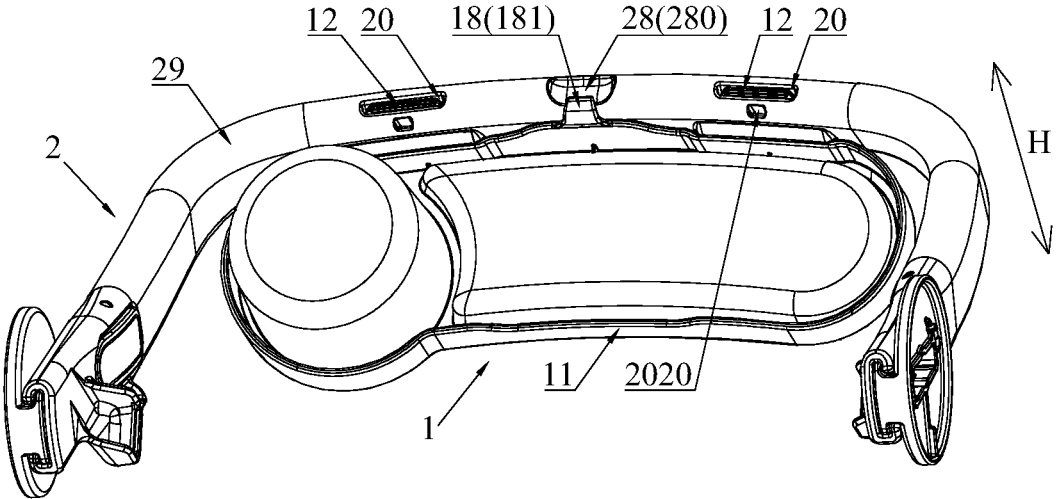
FIG. 12 is a perspective view of the dinner tray shown in FIG. 10 and the dinner tray holder shown in FIG. 11 mounted to each other.

FIG. 12 is a perspective view of the dinner tray 1 and the dinner tray holder 2 after being mounted together according to the second embodiment of the present disclosure. Referring to FIGS. 12 and 13, the dinner tray holder 2 includes an engaging portion 28, and the dinner tray holder 2 is detachably latched to the engaging member 18 through the engaging portion 28. In some embodiments, the engaging portion 28 includes a recessed portion 280 provided at the bottom portion of the dinner tray holder 2, and a height of the recessed portion 280 is lower than a height of an inserting opening of the inserting slot 20, into which the inserting member 12 is inserted. When the hook 181 is used as the engaging member 18, the recessed portion 280 has an inclined surface 281 configured to abut against the hook 181, and the inclined surface 281 does not penetrate the front side of the dinner tray holder 2. In this way, the hook 181 can be latched to the bottom portion of the dinner tray holder 2 to position the dinner tray 1 without affecting the appearance of the dinner tray holder 2. In other embodiments, the recessed portion 280 may have other configurations and is not limited to the above examples, as long as it can be detachably latched to the engaging member 18.

Referring to FIG. 14, in some embodiments, the dinner tray holder 2 includes a holder body 29 formed integrally, and the inserting slot 20 is located in the holder body 29. The inserting slot 20 may be a through slot, which helps to improve the yield rate during the production of the dinner tray holder 2, and foreign objects entering the inserting slot 20 can be directly discharged from a bottom portion of the inserting slot 20. Connecting seats 51 may be mounted at both ends of the holder body 29. The holder body 29 is mounted between the pushing handle 5 and the front foot support 3 as shown in FIGS. 1 and 4 through the connecting seats 51.

Continuing to refer to FIG. 14, in some embodiments, the first locking portion 1210 includes a protrusion formed on the lower surface 122 of the inserting member 12. Correspondingly, the second locking portion 2010 includes a notch formed in the lower side wall 202 of the inserting slot 20. When the inserting member 12 is inserted in place, the protrusion of the first locking portion 1210 is latched to the notch of the second locking portion 2010 to lock the dinner tray 1. Referring to FIGS. 12 and 14, in some embodiments, the notch of the second locking portion 2010 is formed by a through hole 2020, and the through hole 2020 extends through the bottom portion of the dinner tray holder 2 and the inserting slot 20, which also helps to improve the production yield of the dinner tray holder 2, and foreign objects entering the inserting slot 20 can be directly discharged from the bottom portion of the through hole 2020. In alternative embodiments, the positions of the first locking portion 1210 and the second locking portion 2010 may be interchanged. That is, the first locking portion 1210 includes a notch formed on the lower surface 122 of the inserting member 12, and the second locking portion 2010 includes a protrusion formed on the lower side wall 202 of the inserting slot 20.

In some alternative embodiments, the dinner tray 1 and the dinner tray holder 2 according to the second embodiment of the present disclosure may also be modified as follows.

1. The number of the engaging members 18 and the inserting members 12 of the dinner tray 1 is the same, which may be one, two or more. Each engaging member 18 may be located directly below the corresponding inserting member 12. Each pair of vertically spaced inserting members 12 and engaging members 18 provides two positioning positions for the dinner tray 1 in the height direction, which also helps to provide the connection stability between the dinner tray 1 and the dinner tray holder 2. Alternatively, the number of inserting members 12 of the dinner tray 1 may be two or more, and one or two engaging members 18 can be provided between adjacent two inserting members 12, so as to provide more positioning positions for the dinner tray 1.

2. The engaging member 18 may be an engaging tray protruding from the dinner tray body 11, which is in a shape of a sheet and extends along a horizontal direction. The latching portion 28 is an engaging slot formed in the dinner tray holder 2. The engaging tray is located below the inserting member 12, and the engaging slot is correspondingly located below the inserting slot 20. When the dinner tray 1 is mounted on the dinner tray holder 2, each inserting member 12 is inserted into the corresponding inserting slot 20, and the engaging tray is inserted into the corresponding engaging slot. The inserting member 12 and the engaging tray can provide a plurality of positioning positions for the dinner tray 1.

3. The dinner tray holder 2 does not need to be provided with the engaging portion 28. When the dinner tray 1 is mounted on the dinner tray holder 2, as long as the hook 181 of the engaging member 18 is able to be latched to the bottom portion of the dinner tray holder 2.

It should be noted that although the dinner tray 1 and the dinner tray holder 2 provided by the embodiment of the present disclosure are described as being applied to a child carrier 100 as an example, their application scope is not limited to child carriers and can be applied to any suitable products, as long as the product has a long strip element that can serve as the dinner tray holder 2.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A dinner tray, comprising:

a dinner tray body;

at least one inserting member extending from the dinner tray body, and the at least one inserting member being configured to be detachably engaged with at least one inserting slot of a dinner tray holder; and a positioning recess is formed between a lower surface of the at least one inserting member and the dinner tray body, and the positioning recess is configured to be engaged with a positioning protrusion of the dinner tray holder.

2. The dinner tray according to claim 1, wherein the at least one inserting member extends obliquely downward relative to the dinner tray body.

3. The dinner tray according to claim 1, wherein the at least one inserting member is provided with a first locking portion, the dinner tray body is provided with a second locking portion, and the first locking portion is configured to be engaged with the second locking portion; or the at least one inserting member is integrally formed with or attached to the dinner tray body.

4. The dinner tray according to claim 3, wherein the first locking portion comprises a protrusion or a notch formed on at least one of an upper surface and a lower surface of the at least one inserting member.

5. The dinner tray according to claim 1, wherein the inserting member is in a shape of a sheet.

6. The dinner tray according to claim 1, further comprising at least one engaging member configured to be detachably engaged with the dinner tray holder, wherein the at least one engaging member and the at least one inserting member are located at different heights.

7. The dinner tray according to claim 6, wherein the at least one inserting member extends from a first height of the dinner tray body, and the at least one engaging member extends from a second height of the dinner tray body, and the first height is higher greater than the second height.

8. The dinner tray according to claim 6, wherein the at least one engaging member comprises a hook configured to be latched to a bottom portion of the dinner tray holder.

9. The dinner tray according to claim 6, wherein:

at least one inserting member comprises two or more inserting members, and the at least one engaging member is provided between adjacent two inserting members; or the at least one engaging member is provided directly below each inserting member.

10. The dinner tray according to claim 1, wherein the at least one inserting member comprises two or more inserting members, and the two or more inserting members are located on the same side of the dinner tray body and are spaced apart along a length direction of the dinner tray body.

11. A dinner tray holder, comprising:

at least one inserting slot configured to be detachably engaged with at least one inserting member of a dinner tray;

wherein a lower portion of an opening of the at least one inserting slot is provided with a positioning protrusion, and the positioning protrusion is configured to be engaged with a positioning recess of the dinner tray.

12. The dinner tray holder according to claim 11, wherein the at least one inserting slot extends obliquely downward.

13. The dinner tray holder according to claim 11, wherein a side wall of the at least one inserting slot is provided with a second locking portion, and the second locking portion is configured to be engaged with a first locking portion of the dinner tray.

14. The dinner tray holder according to claim 13, wherein the second locking portion comprises a notch or a protrusion formed on at least one of an upper side wall and a lower side wall of the at least one inserting slot.

15. The dinner tray holder according to claim 13, wherein the positioning protrusion protrudes outward relative to the opening; and the positioning protrusion has an arc surface.

16. The dinner tray holder according to claim 11, further comprising at least one engaging portion, wherein the at least one engaging portion is configured to detachably be latched with at least one engaging member of the dinner tray.

17. The dinner tray holder according to claim 16, wherein the at least one engaging portion comprises a recessed portion provided at a bottom portion of the dinner tray holder.

18. The dinner tray holder according to claim 11, wherein:

the dinner tray holder further comprises a holder body formed integrally, the at least one inserting slot is located in the holder body; or the dinner tray holder further comprises an upper holder and a lower holder connected together, one of the upper holder and the lower holder is provided with at least one receiving portion, the other one of the upper holder and the lower holder is provided with at least one protruding portion engaged with the at least one receiving portion, and the at least one inserting slot is located in the at least one protruding portion.

19. A child carrier, wherein a frame of the child carrier comprises the dinner tray holder according to claim 11.

20. A child carrier, comprising:

a dinner tray, comprising:

a dinner tray body; and at least one inserting member extending from the dinner tray body, wherein a positioning recess is formed between a lower surface of the at least one inserting member and the dinner tray body;

a dinner tray holder provided with at least one inserting slot, wherein the at least one inserting member is configured to be detachably engaged with the at least one inserting slot, wherein a lower portion of an opening of the at least one inserting slot is provided with a positioning protrusion, and the positioning protrusion is configured to be engaged with the positioning recess; and wherein the dinner tray holder is a front armrest of the child carrier, and the dinner tray is supported by the dinner tray holder through an engagement of at least one inserting member with at least one inserting slot of the dinner tray holder.

* * * * *